United States Patent [19]
Kalbacher et al.

[11] Patent Number: 5,934,552
[45] Date of Patent: Aug. 10, 1999

[54] THERMALLY RESPONSIVE VALVE ASSEMBLY

[75] Inventors: Klaus Kalbacher, Rangendingen; Karl Schütterle, Walddorfhäslach; Axel Temmesfeld, Raubling; Winfrid Eckerskorn, Ottobrunn, all of Germany

[73] Assignees: Modine Manufacturing Co., Racine, Wis.; Bayerische Motoren Werke, Munich, Germany

[21] Appl. No.: 08/928,927

[22] Filed: Sep. 12, 1997

[30] Foreign Application Priority Data

Sep. 17, 1996 [DE] Germany .......................... 196 37 818

[51] Int. Cl.⁶ .................................................. G05D 23/13
[52] U.S. Cl. .................. 236/12.2; 236/34.5; 236/DIG. 2
[58] Field of Search .............................. 236/12.2, 12.21, 236/12.22, 34, 34.5, DIG. 2

[56] References Cited

U.S. PATENT DOCUMENTS

| | | | |
|---|---|---|---|
| 2,754,062 | 7/1956 | Von Wangenheim | 236/34.5 |
| 3,313,483 | 4/1967 | Nallinger | 236/34.5 |
| 4,165,034 | 8/1979 | Rogers, Jr. et al. | 236/12.2 |
| 4,606,302 | 8/1986 | Huemer et al. | 236/34.5 |

FOREIGN PATENT DOCUMENTS

| | | |
|---|---|---|
| 27 55 465 B2 | 6/1979 | Germany . |
| 40 35 179 A1 | 5/1992 | Germany . |
| 41 06 081 A1 | 7/1992 | Germany . |

Primary Examiner—William E. Tapolcai
Attorney, Agent, or Firm—Wood, Phillips, VanSanten, Clark & Mortimer

[57] ABSTRACT

A thermostatic valve assembly includes three housing components (16, 18, 20) containing two interconnected chambers (64, 78). A first thermally responsive valve unit (68) is disposed in the chamber (64) while a second thermally responsive valve element (98) is disposed in the chamber (78). Both the chambers (64) and (78) have inlets (60, 110) and the chamber (64) has an outlet (66). The valve may assume configurations allowing a minimal flow (FIG. 2), a large volume warm up flow (FIG. 3), a mixed flow regimen (FIG. 4) and a pure cooling flow regimen (FIG. 5).

11 Claims, 4 Drawing Sheets

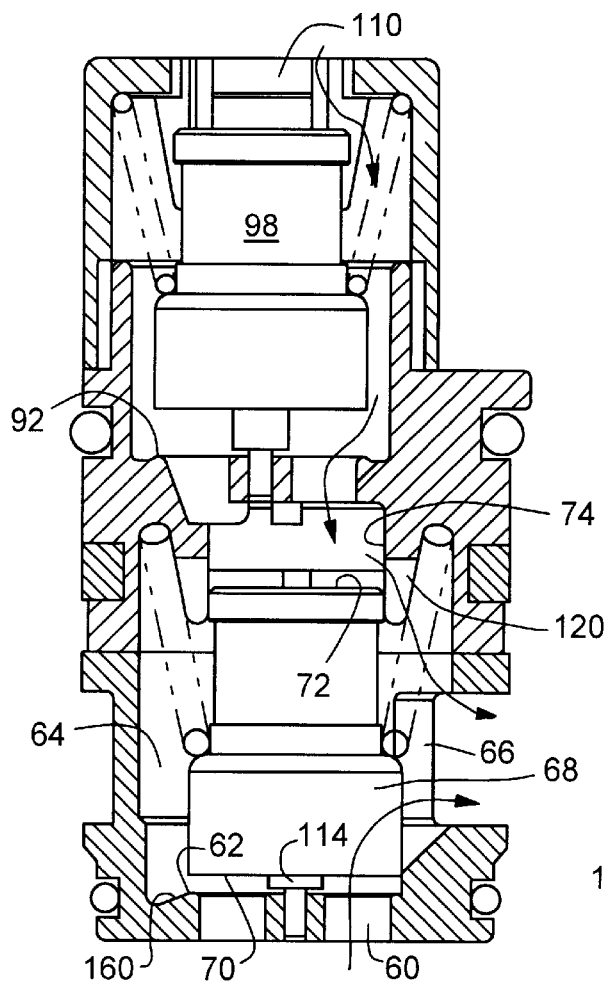
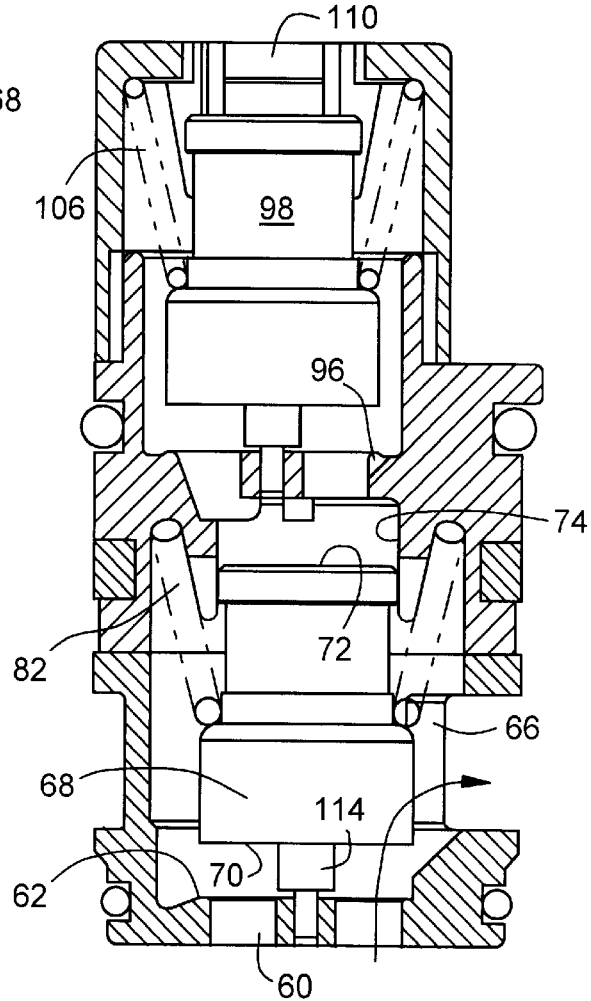

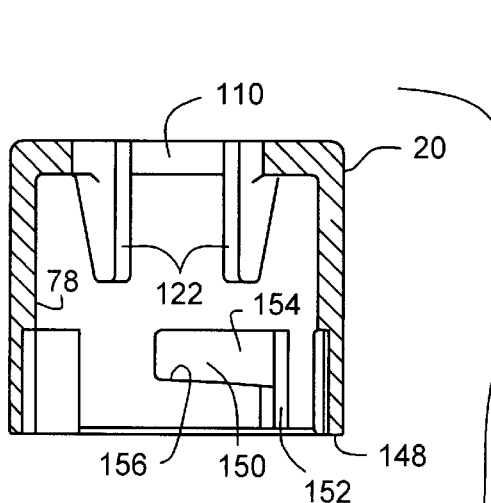
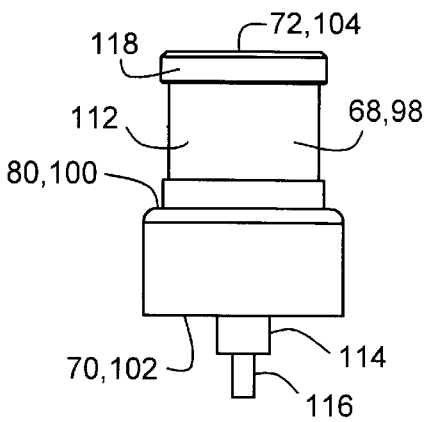
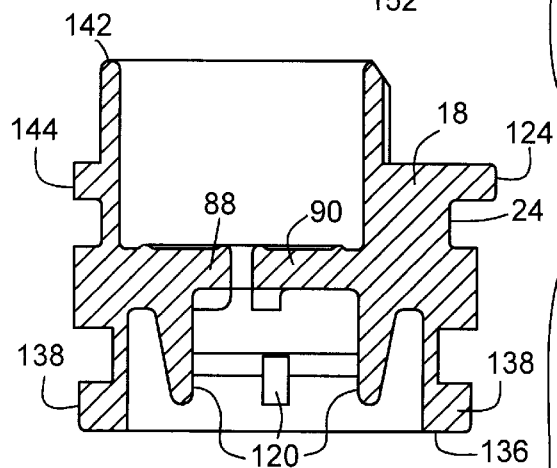
FIG. 7
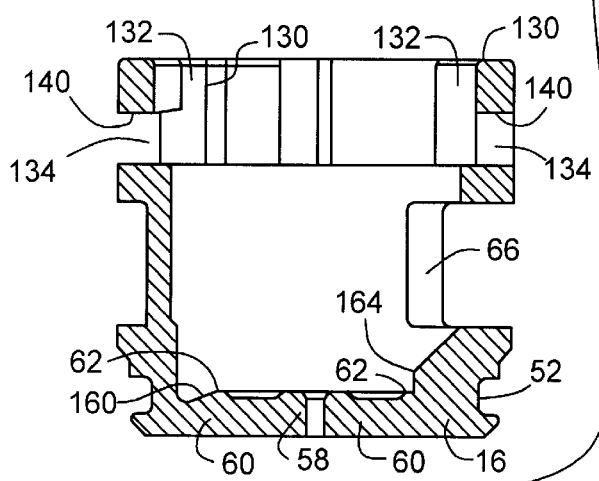
FIG. 6
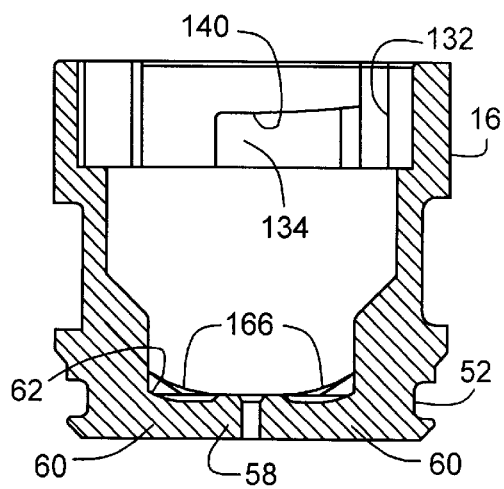
FIG. 8

THERMALLY RESPONSIVE VALVE ASSEMBLY

FIELD OF THE INVENTION

This invention relates to valves, and more particularly, to a thermally responsive valve assembly.

BACKGROUND OF THE INVENTION

German patent publication DE-AS 23 14 301 discloses a thermostatic valve unit having two thermally responsive valves located in a divided housing having inlet and outlet openings. The housing accommodates compression springs that bias the thermally responsive valve elements towards predetermined positions. The housing is a casting which incorporates connectors for the inlet and the outlet and the parts are assembled by means of threaded connectors. Seals are included where appropriate.

The thermally responsive valves carry valve disks for opening and closing against valve seats dependant upon temperature of the fluid flowing into the housing.

Such units are frequently employed in vehicular applications for water cooled engines. In these applications, such valve units may prevent coolant from traveling to the radiator, for example, during a cold start of the engine so that the engine coolant will rapidly heat and allow the engine to warm up promptly. The rapid warm up also permits rapid heating of a passenger compartment for the vehicle as well. After some predetermined temperature is reached, the coolant is then permitted to flow through the radiator to be cooled so as to maintain the coolant generally at the predetermined temperature which is an optimum temperature for engine operation.

To perform these functions, the valve unit is located in connection with the coolant line passing to and from the engine and to the coolant pump from the vehicular radiator as well as optionally from the heater core in the passenger compartment. The coolant lines are typically connected to fittings formed on the valve housing.

Many of these units are difficult to install and, because of the metal casting used as a housing, have an undesirably high weight which impacts on fuel economy. Further, as they are typically designed as the main thermostatic control valve for coolant flow, they frequently are too large and unwieldy for other applications where lesser flow rates are involved. Thus, German patent application DE-PS 44 16 240 discloses a valve that is reduced in size and weight through the use of a plastic housing. This disclosure is not of a valve unit having two thermally responsive valves, but rather, one with but a single thermally responsive valve. Consequently, such a valve does not have the ability to operate in an emergency in many applications as, for example, when the thermally responsive valve fails. Furthermore, the thermally responsive valve has a valve member on the valve body for opening and closing of flow openings, and consequently, is unduly complex.

Other thermally responsive valve units have been proposed but most typically require electrical control and incorporate a variety of relatively complex elements that are used to assure operations in an emergency situation. Again, simplicity is lacking.

The present invention is directed to overcoming one or more of the above problems.

SUMMARY OF THE INVENTION

It is the principal object of the invention to provide a new and improved thermally responsive valve assembly. More specifically, it is an object of the invention to provide such a valve assembly that is light in weight and simple in construction. It is also an object of the invention to provide such a valve assembly that is simple and yet remains operative in the event of an emergency situation involving a failure of some part of the valve assembly.

An exemplary embodiment of the invention achieves the foregoing object in a thermally responsive valve assembly that includes a housing. Two connected chambers are located within the housing and two spaced inlets are disposed in the housing, one to each chamber. An outlet from the housing is provided and is fluidly connected to one of the chambers. A first thermally responsive valve is located in the one chamber for a) closing the inlet to the one chamber for a first temperature condition while allowing fluid communication between the two chambers, b) opening the inlet to the one chamber for a second temperature condition while preventing fluid communication between the two chambers, and c) opening the inlet to the one chamber while allowing fluid communication between the two chambers for at least one third temperature condition between the first and second temperature conditions. Also included is a second thermally responsive valve in the other of the chambers which is operable to a) allow a first flow rate between the two chambers for a fourth temperature condition and b) allow a second flow rate between the two chambers for a fifth temperature condition.

In a preferred embodiment, the first thermally responsive valve controls mixing of the fluid entering the housing through the inlets and the second thermally responsive valve is a temperature responsive choke for fluid flow between the two chambers.

One embodiment of the invention contemplates the use of a spring for normally biasing a first valve member forming part of the first thermally responsive valve toward a position closing the inlet to the one chamber. The second thermally responsive valve also includes a spring which normally biases a second valve member toward a position restricting flow between the chambers.

A highly preferred embodiment contemplates that the housing be defined by three components. Two of the housing components each contain one of the chambers and the third housing component connects the two chambers. Bayonet slots connect the two housing components to opposite sides of the third housing component.

In one embodiment of the invention, a valve seat is located in the third housing component for cooperating with the second valve to control flow between the two chambers. A restricted bypass passage extends about the valve seat.

The invention contemplates that the housing have a generally cylindrical outer surface provided with seal receiving grooves. Preferably, the outer surface is provided with an outwardly directed positioning nose.

The thermally responsive valves each include a body with a plunger extending therefrom and movable with respect thereto. A centering tip is disposed on each of the plungers. In the usual case, the body will contain a quantity of a wax that expands or contracts with temperature changes to extend or retract the plunger.

In one embodiment, each of the chambers includes a centering ring connected to the housing by angularly spaced arms. The centering tips on the plungers are received in an associated one of the centering rings.

In such an embodiment, each of the chambers, oppositely of the associated centering ring, includes axially extending guide surfaces slidably engaging the body of the associated thermally responsive valve so that the body itself acts as a valve member.

In another aspect, a valve assembly is provided that includes a housing made up of first, second and third housing components. The first and third housing components sandwich the second housing component and a flow passage is located in the second housing component. Valve chambers are disposed in each of the first and third housing components and valves are located in each of the chambers. Springs in each of the chambers bias the associated valve towards a predetermined position therein and additionally bias the first and third housing components away from the second housing component. A connector at the interface of the housing components is provided for holding the housing components in assembled relation against the bias of the springs.

In a highly preferred embodiment, there is an interface between the first and second housing components and another interface between the second and third housing components. The connector comprises bayonet slot connections at each of the interfaces.

Other objects and advantages will become apparent from the following specification taken in connection with the accompanying drawings.

DESCRIPTION OF THE DRAWINGS

FIG. 4 is a view similar to FIGS. 2 and 3 but illustrating a condition wherein two flows are mixed within the valve assembly;

FIG. 5 is a view similar to FIGS. 2–4 inclusive but illustrating still another flow condition wherein mixing is precluded;

FIG. 6 is a side elevation of a thermally responsive valve actuator employed in the invention;

FIG. 7 is an exploded view of three housing components which, in turn, are shown in section; and FIG. 8 is a sectional view of one housing component taken at approximately 90 degrees from the view shown in FIG. 7.

DESCRIPTION OF THE PREFERRED EMBODIMENT

Figure 1:
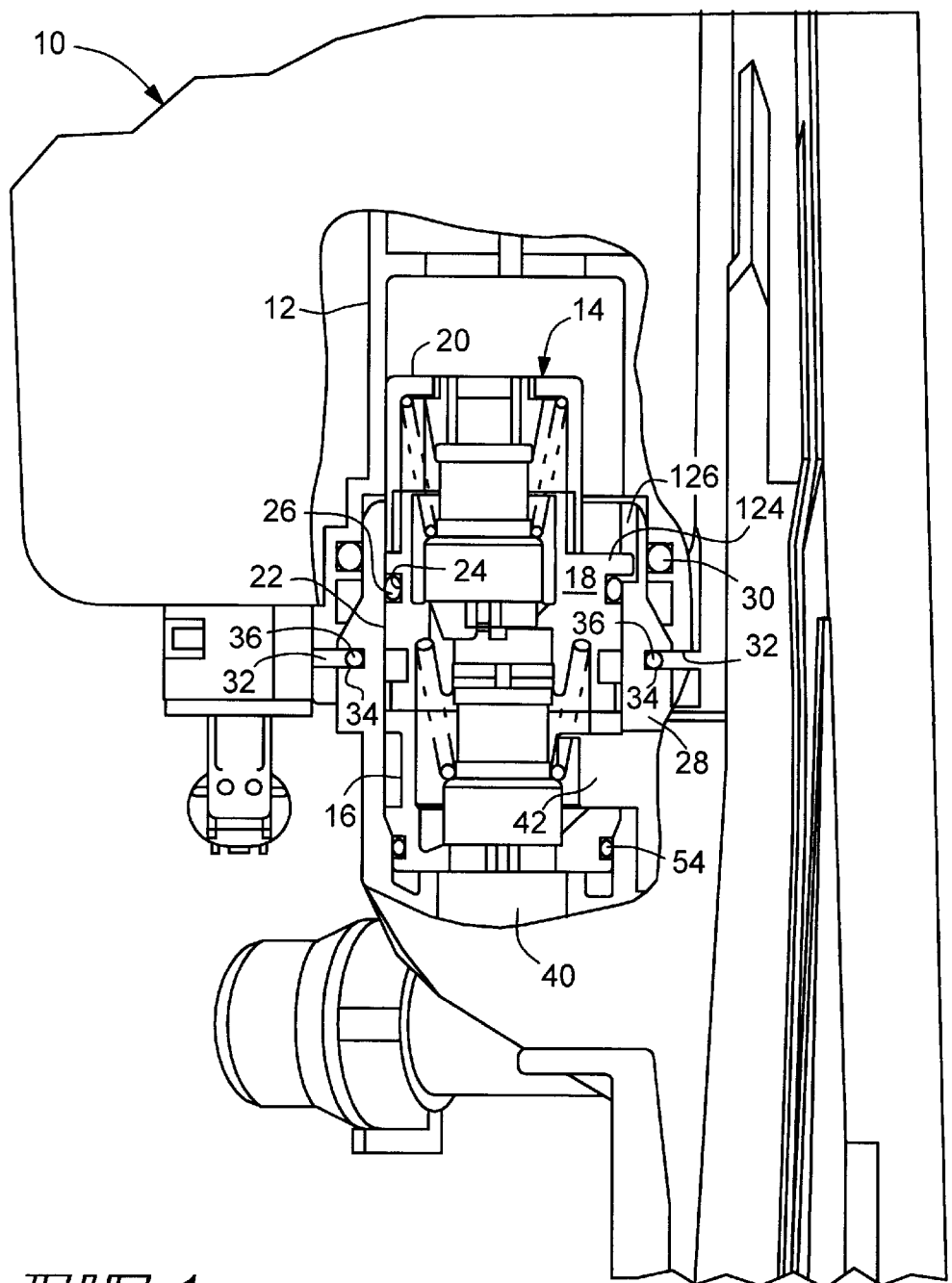
FIG. 1 is a plan view of a coolant reservoir with the thermally responsive valve assembly of the invention installed therein.

FIG. 1 illustrates a preferred embodiment of a thermally responsive valve assembly made according to the invention employed in the coolant circulation system of a vehicle. However, it should be understood that the invention can also be used in other contexts as, for example, fuel or oil circulation systems or anywhere else where flow rate are to be controlled within stipulated temperature ranges. As illustrated in FIG. 1, a vehicle coolant reservoir 10, typically formed of plastic or the like, includes a chamber 12 which may be molded in place and which is adapted to receive the valve assembly, generally designated 14, of the invention. The valve assembly 14 includes a housing made up of three components including a first housing component 16, a second housing component 18, and a third housing component 20. As seen in FIG. 1, the second housing component 18 is sandwiched by the first and third housing components 16 and 20 and includes a cylindrical surface 22 provided with a peripheral groove 24 for receipt of an O-ring seal 26.

A generally cupped shaped containing element or cap 28 fits about the first and second housing components 16,18 and is sealed against the chamber 12 by means of an O-ring seal 30. In addition, slits 32 in the chamber 12 align with slits 34 in the cap 28 to receive a spring retainer 36 to hold the cap 28 in place. The cap 28 may include an inlet opening 40 at its bottom and a side outlet opening 42 adjacent to the first housing component 16. An inlet (not shown) from the reservoir 10 to the interior of the chamber 12 adjacent the third housing component 20 may also be provided.

Turning now to FIGS. 2–5, the valve assembly 14 will be described in greater detail. The first housing component 16 includes a cylindrical surface section 50 including a radially outwardly opening peripheral groove 52 for receipt of an O-ring seal 54 which may seal against the interior of the cap 28. At its lower end, an inlet port 56 is provided which aligns with the opening 40 in the cap 28. A centering ring 58 is disposed in the center of the opening 56 and held in that location by integrally formed radially extending arms 60 which, of course, are angularly spaced to provide flow passages to define the inlet 56. A valve seat 62 surrounds the inlet 56 and faces into a chamber 64 within the third housing component 16.

The outlet passage 42 in the cap 28 is alignable with an outlet 66 in a side of the third housing section 16. The outlet 66 connects to the chamber 64.

Within the chamber 64 is a first thermally responsive valve element 68. The lower end 70 of the valve element may seat against the seat 62 to prevent fluid from entering the chamber 64 through the inlet 56. The upper end 72 of the valve element 68 may enter and seal against a port 74 within the second housing component 18 to close off a passage 76 which normally connects the chamber 64 to a chamber 78 within the third housing component 20.

Intermediate the ends 70 and 72, the valve element 68 includes a shoulder 80. A compression coil spring 82 abuts the shoulder 80 as well as a recess 84 in the second housing component 18. The spring 82 biases the valve element 68 towards the seat 62 and additionally tends to bias the housing components 16 and 18 away from each other for purposes to be seen.

The second housing component 16, above the port 74, includes a centering ring 88 located in place by a number of integrally formed angularly spaced radially extending arms 90 similar to the arms 60. A peripheral seat 92 is located at the radially outward extremity of the upper sides of the arms 90 and in turn is surrounded by an annular recess 94. At one location, the seat 92 includes a groove or slot 96 to allow a continuous, but restricted bypass flow of fluid past the seat 92.

A second thermally responsive valve element 98 is located in the chamber 78 and has a shoulder 100 intermediate its ends 102 and 104. A compression coil spring 106 is abutted against the one end of the chamber 78 and against the shoulder 100 to bias the second valve element 98 toward the seat 92 to close the flow passage within the second housing component 18 interconnecting the chambers 64 and 78 except for the groove or slot 96.

The upper end of the third housing component 20 includes an inlet 110 which may be in fluid communication with the interior of the chamber 12 and the reservoir 10.

Turning now to FIG. 6, a representative thermally responsive valve element that may be used for both the valve elements 66 and the valve element 98 is illustrated. The valve element 66, 98, includes a body 112 which typically will be a container of a wax having a relatively large coefficient of thermal expansion. A plunger 114 extends into the body 12 and as the wax within the body 112 expands in response to an increase in temperature, the plunger 114 will progressively emerge from the body 112. If the temperature decreases, the quantity of wax within the body 112 will decrease in volume with the consequence that the plunger 114 will be retracted. The plunger 114 is provided with a centering tip 116 which is received within the associated centering ring 58, 88 dependent upon whether the valve element is being utilized as the first valve element 66 or the second valve element 98. This serves to align the ends 70, 102 with seats 62, 92, respectively.

Figure 2:
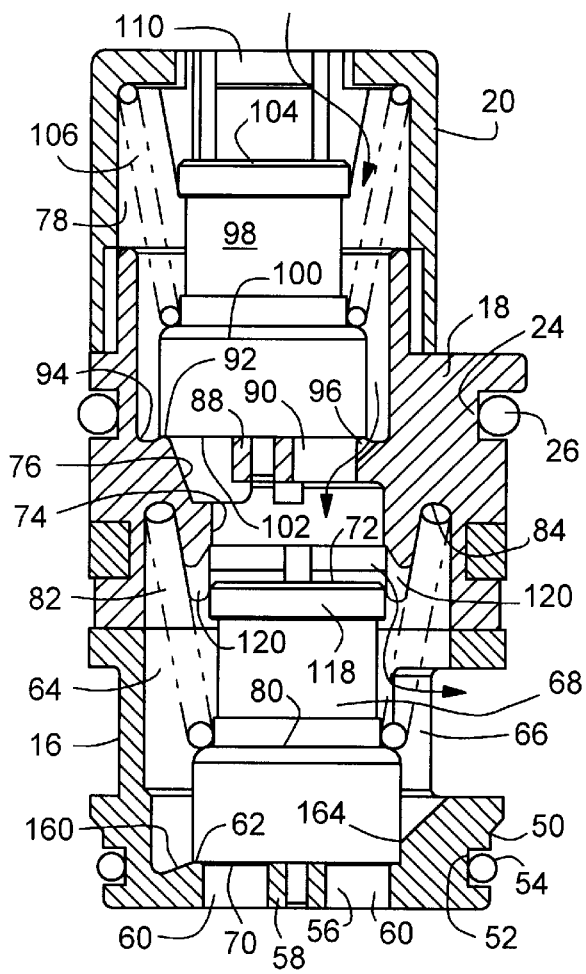
FIG. 2 is a sectional view of the thermally responsive valve assembly in one flow configuration, allowing minimal flow through the valve.
Figure 3:
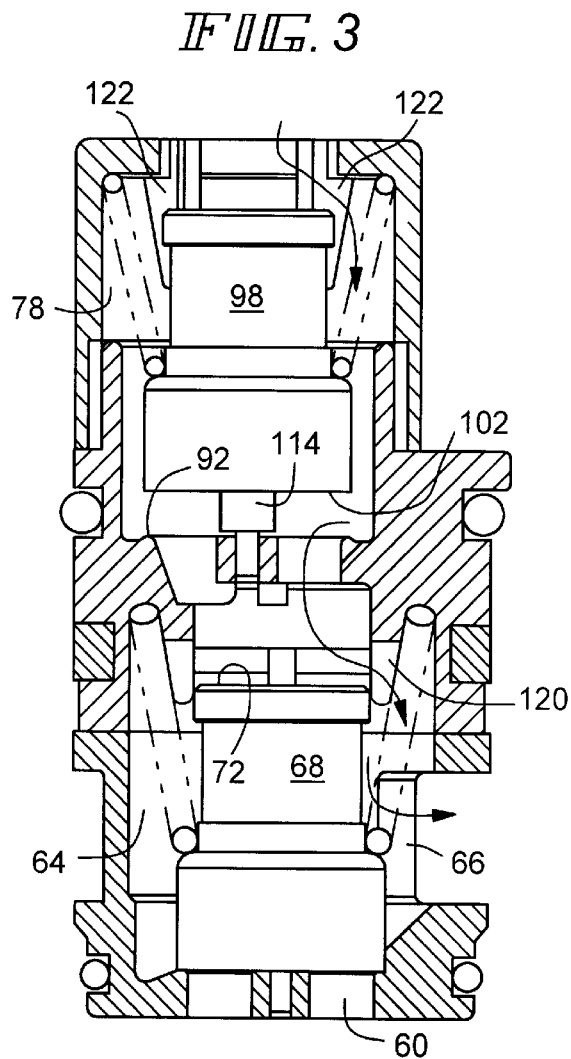
FIG. 3 is a view similar to FIG. 2 but showing another flow condition wherein the valve is allowing substantial flow.

Each valve element 66, 98, adjacent to the upper ends 72, 104, includes a cylindrical surface 118 for guiding purposes. As seen in FIG. 7, the second housing component 18, on the side thereof facing the chamber 64, includes four equally angularly spaced guide projections 120 (only three are shown) which embrace the cylindrical surface 118 to guide the end 72 of the valve element 68 into and out of the port 74. When the end 72 is within the port 74, it will be appreciated that fluid communication between the chambers 64 and 78 is halted. This is as shown in FIG. 5. However, when the end 72 is spaced from the port 74 as is shown in FIGS. 2–4, inclusive, fluid flow from the chamber 78 to the chamber 64 between the fingers 120 is permitted.

The opening 110 in the third housing component 20 includes depending fingers 122 which serve to slidably embrace the cylindrical surface 118 on the valve element 98 to guide the same. In this case, the end 104 of the second valve element 98 never seals against the seat but moves sufficiently close to the opening 110 as to throttle flow through the inlet defined thereby when in the position illustrated in FIGS. 3–5 inclusive. In the position shown in FIG. 2, full flow through the inlet 110 is allowed.

Still referring to FIG. 7, it is to be observed that the second housing component 118 includes a radially outwardly directed projection 124. This projection can be used to align in a slot 126 (FIG. 1) in the cap 28 to assure that the components of the valve assembly 10 are properly aligned with components such as the outlet 42 in the cap 28.

The invention also includes unique means for securing the housing components 16, 18, 20 together against the bias of the springs 82, 106. The upper end 130 of the first housing component 16 is provided with two, equally angularly spaced L-shaped recesses or slots each having a vertical component 132 and a horizontal component 134. The lower end 136 of the second housing component 18, in turn, includes two equally angularly spaced, radially outward directed projections 138 which are sized to snuggly fit in the vertical sections 132 of the slots 130 as well as in the horizontal sections 134 thereof. Those skilled in the art will recognize that each set of the components 130, 132, 134 and 138 thus defines a bayonet slot whereby the second housing component 18 may have the projections 138 inserted in the vertical sections 132 of the slots and moved downwardly to align with the horizontal sections 134 and then twisted to lodge the projections 138 under shoulders 140 defined by the upper surfaces of the horizontal sections 134.

The second housing component 118, near its upper end 142, includes similar radially outwardly directed projections 144. In this case, three of the projections 144 that are equally angularly spaced, are employed. The lower end 148 of the third housing component 20 is provided with three L-shaped slots 150 each having a vertical component 152 and a horizontal component 154. Again, the projections 144 are sized to snugly fit within the vertical components 152 as well as the horizontal components 154 of the corresponding slot 150 and lodge, upon twisting, against the shoulder 156 in each of the slots 150.

It will be immediately appreciated that another set of bayonet slot connections is defined and that such bayonet slot connections hold the housing components 16,18, 20 in assembled relation against the bias of the springs 82, 106 as mentioned previously. This bias, of course, assures tightness of the bayonet slot connections.

Referring now to FIGS. 2, 7 and 8, the structure surrounding the seat 62 will be described. Oppositely of the outlet opening 66, and radially outward of the seat 62 is a depression 160. At the same time, immediately adjacent the outlet opening 66 and radially outward of the seat 62 is a step 164. As can be seen in FIG. 8, which, it will be recalled, is a section taken at 90 degrees to the section shown in FIG. 7, merging surfaces 166 extend from the depression 160 to the step 164.

The purpose of this construction is to insure that the first valve assembly 68 is well bathed in the fluid entering the inlet 56 so that it accurately responds to the temperature thereof. As viewed in FIG. 4, fluid entering the inlet 56 is required to pass below the bottom side 70 of the first valve element 68 toward the depression 160 which is directly opposite from the outlet 66. As a consequence, the fluid necessarily must flow entirely around the first valve element 68 so that it will be essentially at the temperature of such fluid.

FIG. 2 illustrates the configuration of the components relative to one another with a low volume flow rate, as might be employed during the start up phase of a vehicle. Specifically, heated coolant will be retained within the engine and/or the heater core and only a small volume of heated water may be diverted elsewhere as, for example, to preheat transmission fluid. Specifically, warmed coolant enters the inlet 110 to the chamber 78 and flows about the second valve element 98 to the annulus 94 about the seat 92. From there it flows through the slot or groove 96 and between the fingers 120 and the upper end 72 of the first valve 68 to the outlet 66.

Another configuration of the components is illustrated in FIG. 3. In this case, the second valve element 98 has been warmed by heated coolant sufficiently that its plunger 114 has extended to lift the bottom surface 102 off of the seat 92. As a consequence, there will be free flow of heated fluid through the chamber 78 past the seat 92 and ultimately between the fingers 120 and the upper end 72 of the first valve element 66. This flow will exit the valve through the outlet 66 while passing about the first valve unit 66. Generally speaking, a stop may be utilized to limit upward movement of the second valve element 98 to the position shown in FIG. 3.

FIG. 4 shows still another configuration of the components. In this case, the second valve element 98 is in the same position as illustrated in FIG. 3. The flow past the seat 92 has been sufficient to bring the first valve element 68 up to a temperature whereat its plunger 114 has begin to emerge from the bottom surface 70. As a consequence of this configuration, flow may occur past the seat 92 and between the upper end 72 and the fingers 120 toward the outlet 66. However, it may also occur past the seat 62 from the inlet 56 with a consequence that the two flows will mix within the chamber 64.

FIG. 5 illustrates the components in a pure cooling phase where all coolant is circulated to, for example, a radiator to be cooled. In this case, the upper end 72 of the first valve element 68 is blocking the port 74 precluding flow from the inlet 110 to the outlet 66. On the other hand, the lower end 70 of the first valve unit 68 is now at a maximum distance from the seat 62 so that all inflow from the inlet 60 passes to the outlet 66.

When the vehicle is shut down, the coolant will gradually cool to the ambient temperature causing the wax within the valve unit 68 and 98 to diminish in volume. At this time, the springs 82, 106 will assure that all components are returned to the configuration illustrated in FIG. 2.

For typical vehicular operations, it will be desirable that both the first valve element 68 and the second valve element 98 operate at roughly the same temperature, for example, 80° C. It will be appreciated that the operation is such as to handle even emergency situations in that should either one of the valve elements 68 or 98 fail, there will always be a flow path open, either from the inlet 110 to the outlet 66 via the slot 96 or from the inlet 56 to the outlet 66 past the valve seat 62.

It will also be appreciated that a valve made according to the invention is easy to fabricate and may be made of plastic housing components to reduce cost and weight. And the unique use of three housing components coupled by bayonets slots against the bias of springs provides an easy means of assembly while assuring that the components are fixed relative to one another.

We claim:

1. A thermally responsive valve assembly comprising;
   a housing;
   two connected chambers within said housing;
   two spaced inlets in said housing, one to each said chamber;
   an outlet from said housing and fluidly connected to one of said chambers;
   a first thermally responsive valve in said one chamber for a) closing the inlet to said one chamber for a first temperature condition while allowing fluid communication between said two chambers, b) opening the inlet to said one chamber for a second temperature condition while preventing fluid communication between said two chambers, and c) opening the inlet to said one chamber while allowing fluid communication between said two chambers for at least one third temperature condition between said first and second temperature condition; and
   a second thermally responsive valve in the other of said chambers and operable to a) allow a first flow rate between said two chambers for a fourth temperature condition and b) allow a second flow rate between said two chambers for a fifth temperature condition.

2. The thermally responsive valve assembly of claim 1 wherein said first thermally responsive valve controls mixing of fluid entering said housing through said inlets and said second thermally responsive valve is a temperature responsive choke for fluid flow between said chambers.

3. The thermally responsive valve assembly of claim 1 wherein said first thermally responsive valve includes a spring normally biasing a first valve member toward a position closing the inlet to said one chamber and said second thermally responsive valve includes a spring normally biasing a second valve member toward a position restricting flow between said chambers.

4. The thermally responsive valve assembly of claim 1 wherein said housing is defined by three components, two of which each contain one of said chambers and the third of which connects said chambers; and bayonet slot means connecting said two housing components to opposite sides of said third housing component.

5. The thermally responsive valve assembly of claim 4 further including a valve seat in said third housing component for cooperating with said second valve to control flow between said two chambers; and a restricted bypass passage about said valve seat.

6. The thermally responsive valve assembly of claim 1 wherein said housing has a generally cylindrical outer surface provided with a seal receiving groove.

7. The thermally responsive valve assembly of claim 1 wherein said housing has an outer surface provided with an outwardly directed positioning nose.

8. The thermally responsive valve assembly of claim 1 wherein said thermally responsive valves each include a body with a plunger extending therefrom and movable with respect thereto; and a centering tip on each of said plungers.

9. The thermally responsive valve assembly of claim 8 wherein each of said chambers includes a centering ring connected to said housing by angularly spaced arms; said centering tips being received in an associated one of said centering rings.

10. The thermally responsive valve assembly of claim 9 wherein each of said chambers, oppositely of the associated centering ring, includes axially extending guide surfaces slidably engaging the body of the associated thermally responsive valve.

11. The thermally responsive valve assembly of claim 10 wherein said housing is defined by three components, two of which each contain one of said chambers and the third of which connects said chambers; and bayonet slot means connecting said two housing components to opposite sides of said third housing component; each of said thermally responsive valve bodies including a shoulder; a first compression spring in said one chamber abutting the shoulder of said first thermally responsive valve and said third housing component; and a second compression spring in the other of said chambers and abutting one of said two housing components and the second thermally responsive valve, said springs serving to bias said valves toward predetermined positions and to bias said housing components away from one another to assure tightness of said bayonet slot means.

* * * * *